(12) United States Patent
Ikeno (10) Patent No.: US 10,634,977 B2
(45) Date of Patent: Apr. 28, 2020

(54) IMAGE DISPLAY DEVICE PROVIDED WITH FLOW-RATE SENSOR

(71) Applicant: KOA CORPORATION, Nagano (JP)

(72) Inventor: Tomokazu Ikeno, Nagano (JP)

(73) Assignee: KOA CORPORATION, Nagano (JP)

( * ) Notice: Subject to any disclaimer, the term of this patent is extended or adjusted under 35 U.S.C. 154(b) by 0 days.

(21) Appl. No.: 16/337,722

(22) PCT Filed: Aug. 15, 2017

(86) PCT No.: PCT/JP2017/029377
§ 371 (c)(1),
(2) Date: Mar. 28, 2019

(87) PCT Pub. No.: WO2018/061500
PCT Pub. Date: Apr. 5, 2018

(65) Prior Publication Data
US 2019/0234773 A1 Aug. 1, 2019

(30) Foreign Application Priority Data
Sep. 30, 2016 (JP) .................................. 2016-194076

(51) Int. Cl.
*G03B 21/00* (2006.01)
*G01D 7/06* (2006.01)
(Continued)

(52) U.S. Cl.
CPC .............. *G03B 21/00* (2013.01); *G01D 7/06* (2013.01); *G01P 13/00* (2013.01); *G03B 21/134* (2013.01); *H04N 5/74* (2013.01)

(58) Field of Classification Search
CPC . G01D 7/06; G01P 13/00; H04N 5/74; G03B 21/00; G03B 21/134
See application file for complete search history.

(56) References Cited

U.S. PATENT DOCUMENTS

| 3,442,125 A | 5/1969 | Foley | |
|---|---|---|---|
| 2002/0021437 A1* | 2/2002 | Volkenandt | ........ G01M 11/0228 356/124.5 |

(Continued)

FOREIGN PATENT DOCUMENTS

| JP | 2011-64504 | 3/2011 |
|---|---|---|
| JP | 2012-194145 | 10/2012 |

(Continued)

OTHER PUBLICATIONS

Official Communication issued in International Bureau of WIPO Patent Application No. PCT/JP2017/029377, dated Nov. 14, 2017.

*Primary Examiner* — Cara E Rakowski
*Assistant Examiner* — Magda Cruz
(74) *Attorney, Agent, or Firm* — Greenblum & Bernstein, P.L.C.

(57) ABSTRACT

To provide an image display device configured to more faithfully display a projection image on a region where a physical quantity change has occurred. An image display device of the present invention includes a flow rate sensor and a screen on which an image from a projector is projected, and a control is performed such that the image is projected on the screen so as to include a position of the flow rate sensor that has detected the physical quantity change, and the image changes corresponding to a measured value change of the flow rate sensor. Preferably, a plurality of the physical quantity detection units are disposed, and the control is performed such that the image changes corresponding to the measured value changes in the respective physical quantity detection units.

2 Claims, 9 Drawing Sheets (51) Int. Cl.
*H04N 5/74* (2006.01)
*G01P 13/00* (2006.01)
*G03B 21/134* (2006.01)

(56) References Cited

U.S. PATENT DOCUMENTS

| | | | | |
|---|---|---|---|---|
| 2004/0017357 | A1* | 1/2004 | Kinoshita | G06F 3/0338 345/163 |
| 2007/0089658 | A1* | 4/2007 | Witte | G01P 13/02 114/102.13 |
| 2010/0302205 | A1* | 12/2010 | Noma | G06F 3/041 345/174 |

FOREIGN PATENT DOCUMENTS

| | | |
|---|---|---|
| JP | 5504777 | 5/2014 |
| JP | 2017-067724 | 4/2017 |
| WO | 2015/115261 | 8/2015 |

* cited by examiner

IMAGE DISPLAY DEVICE PROVIDED WITH FLOW-RATE SENSOR

TECHNICAL FIELD

The present invention relates to an image display device that displays a projection image on a display body.

BACKGROUND ART

For example, there has been known a notification system that includes a wind information detection device to detect a blowing wind for each region, and notifies wind information detected by the wind information detection device by a display form on an LED and the like disposed on each region (for example, see Patent Document 1).

With the invention disclosed in Patent Document 1, a sidewalk around a construction is divided into a plurality of regions, and the wind information detection device and a plurality of LED panels are arranged side by side in each region. Then, on the basis of the wind information detected by the wind information detection device, the display form on the LED panel is changed to ensure a passerby to be notified of a wind state at a passing location.
Patent Document 1: Japanese Patent No. 5504777

DISCLOSURE OF THE INVENTION

Problems to be Solved by the Invention

However, in the invention disclosed in Patent Document 1, since a distance between the wind information detection device and the LED panel is long, accurate wind information is not necessarily reflected on the display on the LED.

That is, the wind state sensed by the passerby is different from the display on the LED in some cases, and a gap between the sense of the passerby and the display on the LED is easily generated.

Therefore, the present invention is made in consideration of the above-described problem, and it is an object to provide an image display device configured to more faithfully display a projection image on a region where a physical quantity change has occurred.

Solutions to the Problems

An image display device of the present invention includes a physical quantity detection unit and a display body on which an image from a projecting device is projected. The image display device performs a control such that the image is projected on the display body so as to include a position of the physical quantity detection unit that has detected a physical quantity change, and the image changes corresponding to a measured value change of the physical quantity detection unit.

In the present invention, a plurality of the physical quantity detection units may be provided and the control may be performed such that the image changes corresponding to the measured value changes of the respective physical quantity detection units.

In the present invention, the display body may have a through hole communicated with the physical quantity detection unit, and the physical quantity change may be detected by the physical quantity detection unit via the through hole.

Effects of the Invention

The image display device of the present invention is configured to more faithfully display the projection image on the region where the physical quantity change has occurred. This ensures a match between a sense of a user and a display of a projection image to provide a comfortable use feeling.

DESCRIPTION OF PREFERRED EMBODIMENTS

The following describes one embodiment of the present invention (hereinafter abbreviated as "the embodiment") in detail. The present invention is not limited to the following embodiments, but can be embodied in various modifications in a range of its gist.

Figure 1:
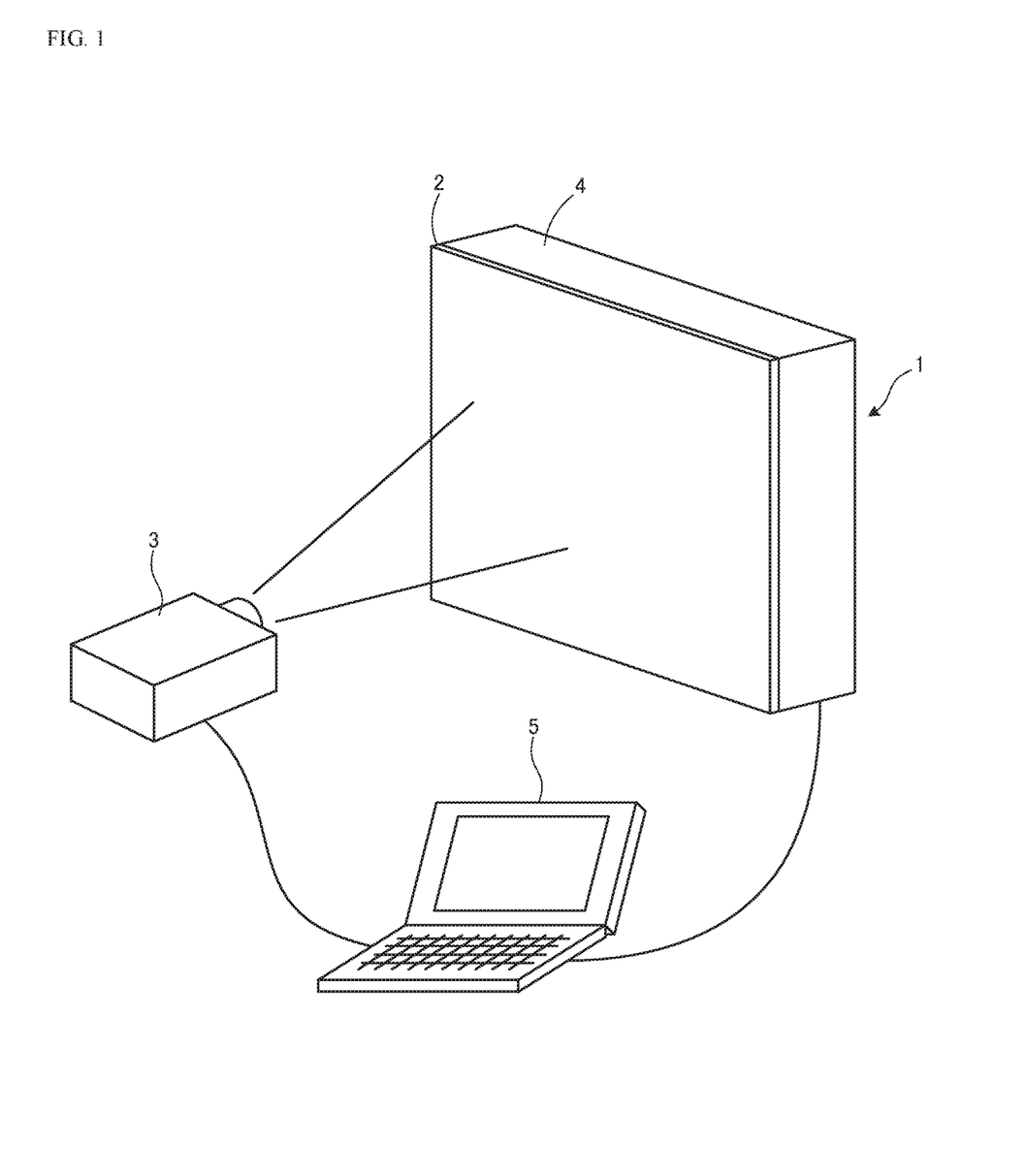
FIG. 1 is a conceptual diagram of an image display device according to the embodiment.
Figure 2:
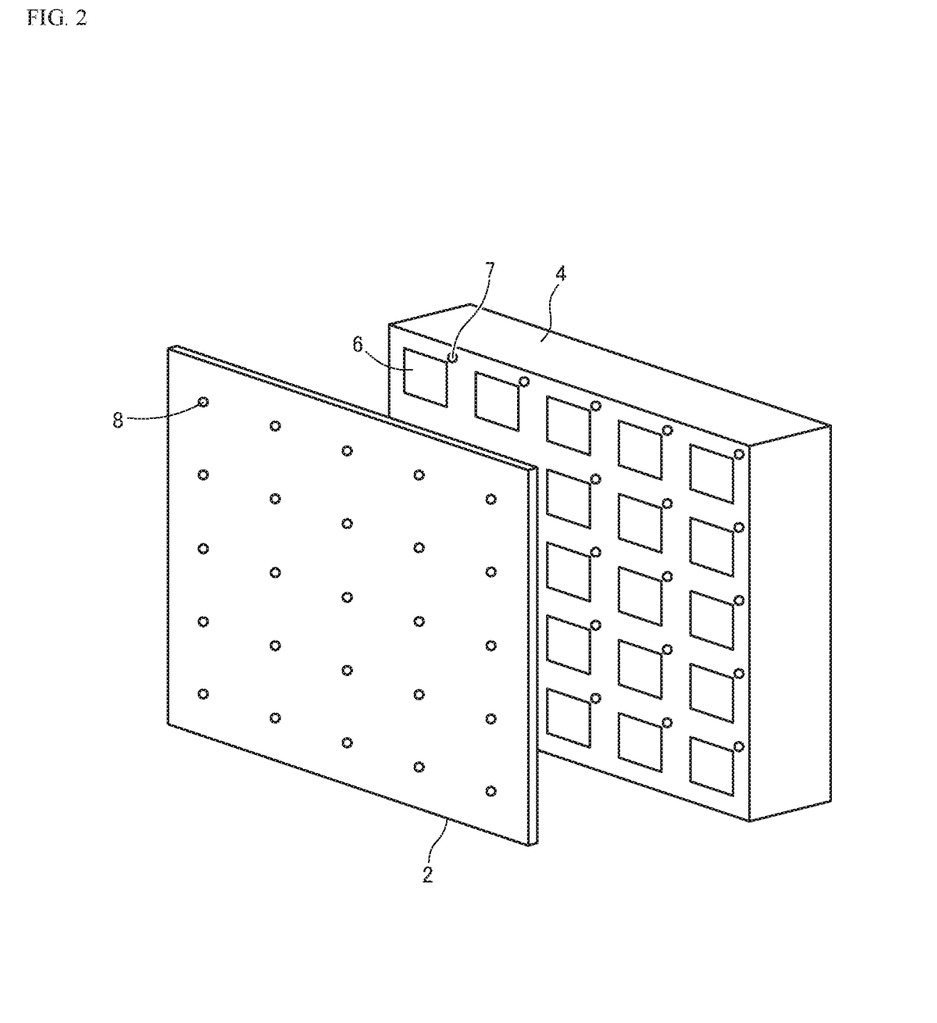
FIG. 2 is a partially exploded perspective view of the image display device illustrated in FIG. 1.
Figure 3:
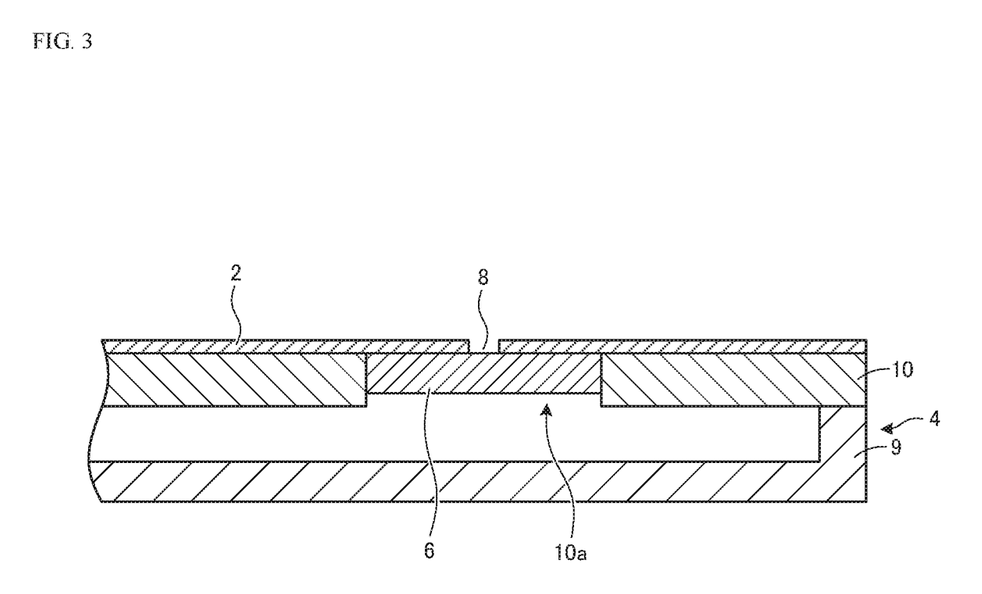
FIG. 3 is a partially enlarged cross-sectional view of the image display device according to the embodiment.
Figure 4:
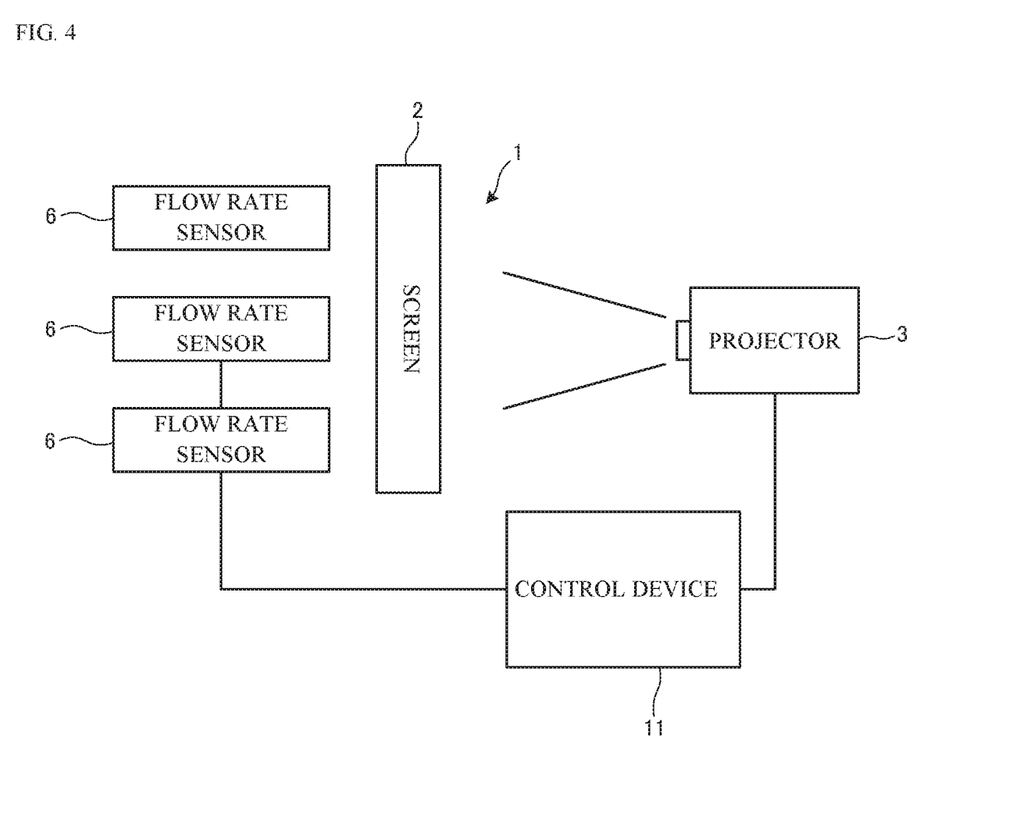
FIG. 4 is a block diagram of the image display device according to the embodiment.

FIG. 1 is a conceptual diagram of an image display device according to the embodiment. FIG. 2 is a partially exploded perspective view of the image display device illustrated in FIG. 1. FIG. 3 is a partially enlarged cross-sectional view of the image display device according to the embodiment. FIG. 4 is a block diagram of the image display device according to the embodiment.

As illustrated in FIG. 1, an image display device 1 according to the embodiment is configured such that an image is projected on a front surface of a screen (display body) 2 with a projector (projecting device) 3.

As illustrated in FIG. 1, on a back side of the screen 2, a physical quantity detection device 4 is disposed. As illustrated in FIG. 1, a computer device 5 electrically couples the projector 3 to the physical quantity detection device 4.

As illustrated in FIG. 2, the physical quantity detection device 4 includes an arrayed plurality of physical quantity detection units 6. In this embodiment, a description will be given with the physical quantity detection unit 6 as a flow rate sensor (hereinafter referred to as a flow rate sensor 6). As illustrated in FIG. 2, the plurality of flow rate sensors 6 are arranged in a matrix in perpendicular two directions, while the arrangement illustrated in FIG. 2 is one example and the arrangement is not limited to this. For example, the flow rate sensors 6 may be arranged in a row, or may be arranged in a shape other than a straight line, for example, a ring shape.

In the embodiment illustrated in FIG. 2, light emitting portions 7, such as LEDs, electrically coupled to the respective flow rate sensors 6 are disposed, but the light emitting portions 7 are optionally disposed. The respective light emitting portions 7 are disposed close to the electrically coupled flow rate sensors 6.

As illustrated in FIG. 2, the screen 2 has minute through holes 8 on positions facing the respective flow rate sensors 6. The through holes 8 are holes to send a wind to the flow rate sensors 6, and the respective flow rate sensors 6 can detect the wind via the through holes 8.

As illustrated in FIG. 3, the physical quantity detection device 4 includes a housing 9 and a front panel 10 disposed on a front surface of the housing 9, and the front panel 10 has a housing space 10a where the respective flow rate sensors 6 are disposed. While the illustration is omitted, the housing 9 internally includes a control system electrically coupled to each of the flow rate sensors 6.

As illustrated in FIG. 3, the screen 2 is disposed on the front surfaces of the flow rate sensors 6 and the front panel 10 via an adhesive layer (not illustrated). At this time, through holes 8 provided on the screen 2 are communicated with detection surfaces of the flow rate sensors 6.

As illustrated in the block diagram of FIG. 4, the image is projected from the projector 3 on the screen 2 disposed on the front surfaces of the respective flow rate sensors 6. That is, the image is projected on the front surface of the screen 2 with the plurality of flow rate sensors 6 disposed right behind the screen 2.

A control device 11 illustrated in FIG. 4 is a part that executes an image display process based on measured values of the respective flow rate sensors 6. In the embodiment, the control device 11 is a general term including, for example, the computer device 5 illustrated in FIG. 1 and a microcomputer as a control system coupled to the respective flow rate sensors 6 in the physical quantity detection device 4, but the configuration is not limited insofar as the control device 11 is configured to execute the image display process.

Figure 5:
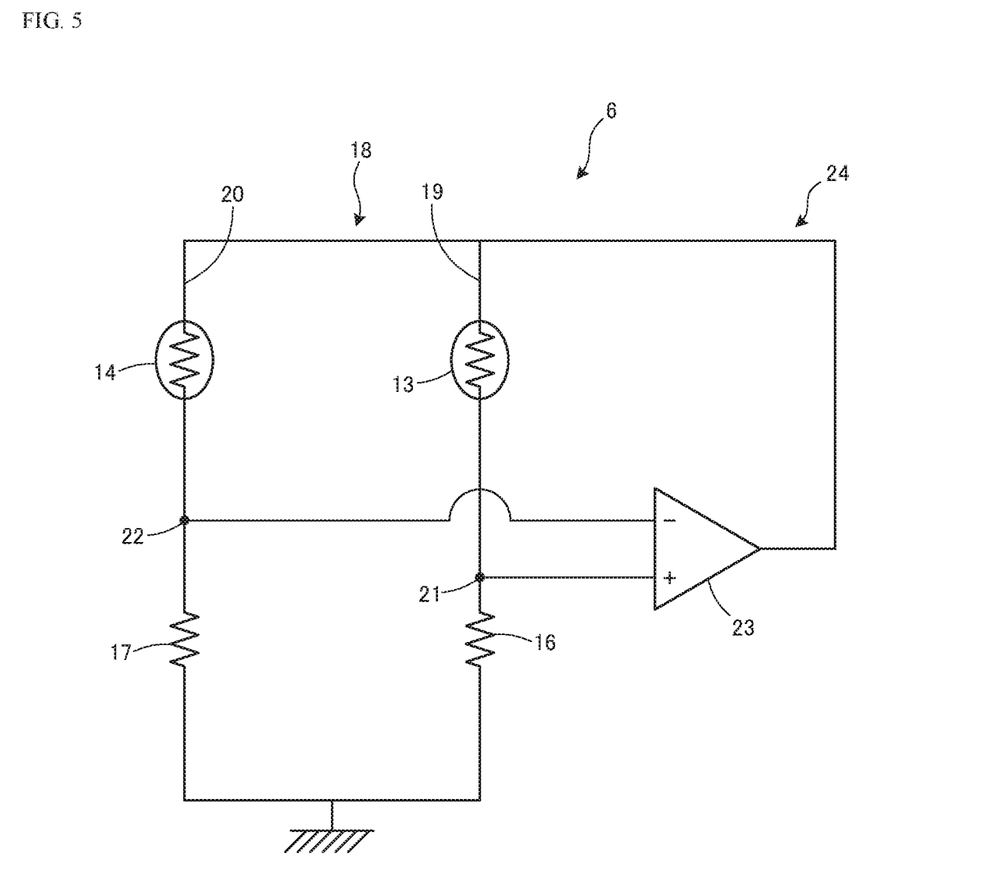
FIG. 5 is a circuit diagram of a flow rate sensor used in the image display device according to the embodiment.

FIG. 5 is a circuit diagram of the flow rate sensor 6 according to the embodiment. As illustrated in FIG. 5, a flow rate detection resistive element 13, a temperature compensation resistive element 14, and resistors 16 and 17 constitute a bridge circuit 18. As illustrated in FIG. 5, the flow rate detection resistive element 13 and the resistor 16 constitute a first series circuit 19, and the temperature compensation resistive element 14 and the resistor 17 constitute a second series circuit 20. Then, the first series circuit 19 and the second series circuit 20 are coupled in parallel to constitute the bridge circuit 18.

As illustrated in FIG. 5, an output unit 21 of the first series circuit 19 and an output unit 22 of the second series circuit 20 are each coupled to a differential amplifier (amplifier) 23. A feed-back circuit 24 including the differential amplifier 23 is coupled to the bridge circuit 18. The feed-back circuit 24 includes a transistor (not illustrated) and the like.

The resistors 16 and 17 have temperature coefficient of resistances (TCRs) smaller than those of the flow rate detection resistive element 13 and the temperature compensation resistive element 14. The flow rate detection resistive element 13 is controlled, for example, so as to have a predetermined resistance value Rs1 in a heated state where a temperature is controlled to be higher than a predetermined ambient temperature by a predetermined value. The temperature compensation resistive element 14 is controlled, for example, so as to have a predetermined resistance value Rs2 at the ambient temperature. The resistance value Rs1 is smaller than the resistance value Rs2. The resistor 16, which constitutes the first series circuit 19 with the flow rate detection resistive element 13, is, for example, a fixed resistor that has a resistance value R1 similar to the resistance value Rs1 of the flow rate detection resistive element 13. The resistor 17, which constitutes the second series circuit 20 with the temperature compensation resistive element 14, is, for example, a fixed resistor that has a resistance value R2 similar to the resistance value Rs2 of the temperature compensation resistive element 14.

The flow rate detection resistive element 13 illustrated in FIG. 5 is disposed on the front surface side (screen 2 side) of the flow rate sensor 6 illustrated in FIG. 3, and the temperature compensation resistive element 14 is disposed on the back surface side of the flow rate sensor 6 illustrated in FIG. 3.

In a windless state, when the wind blows, the wind passes through the through holes 8 illustrated in FIG. 3 and reaches the flow rate detection resistive elements 13 disposed on the detection surfaces. At this time, since the flow rate detection resistive element 13 as a heating resistor decreases in temperature, an electric potential of the output unit 21 of the first series circuit 19, to which the flow rate detection resistive element 13 is coupled, varies. This provides a differential output via the differential amplifier 23. Then, in the feed-back circuit 24, a driving voltage is applied to the flow rate detection resistive element 13 based on the differential output. As illustrated in FIG. 4, the control device 11 can calculate a wind speed based on the change in voltage necessary for heating the flow rate detection resistive element 13 and output the wind speed. The change in wind speed causes a change in temperature of the flow rate detection resistive element 13, thus ensuring the detection of the wind speed. Note that, the control device 11 can detect an electrical change such as a voltage change to perform a projection display process.

Note that, the circuit configuration of the flow rate sensor 6 illustrated in FIG. 5 is merely one example, and the configuration is not limited to this.

The control device 11 according to the embodiment performs the control such that the image is projected on the screen 2 so as to include a position of the flow rate sensor 6 that has detected the wind and the image changes corresponding to the measured value change (voltage change) of the flow rate sensor 6. The following describes examples of the projection image with reference to FIG. 6 to FIG. 8.

Figure 6:
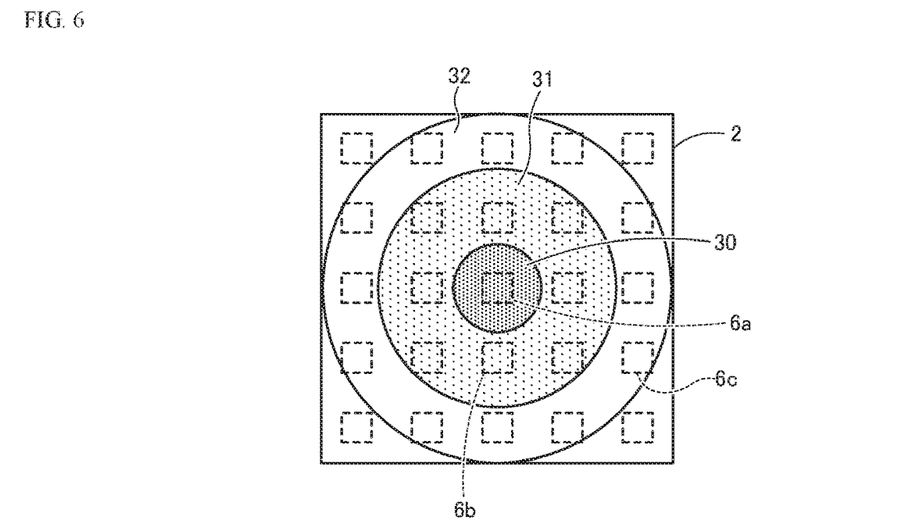
FIG. 6 is an exemplary projection image according to the embodiment.

FIG. 6 illustrates an example where strength of the wind blowing against the screen 2 is illustrated as the projection image. In FIG. 6, a strongest wind (first wind) blows on the center of the screen 2, and a small circle image 30 is projected on the screen 2 so as to include a position of a center flow rate sensor 6a that has detected the first wind. On the outside of the small circle image 30, a wind (second wind) weaker than that of the center blows on the screen 2, and a medium circle image 31 is projected on the screen 2 so as to include a position of a flow rate sensor 6b that has detected the second wind. On the outside of the medium circle image 31, a further weak wind (third wind) blows on the screen 2, and a large circle image 32 is projected on the screen 2 so as to include a position of a flow rate sensor 6c that has detected the third wind. Then, for example, the small circle image 30 is displayed with a darkest color, and the display color becomes light in the order of the medium circle image 31 and the large circle image 32.

In the embodiment, since the flow rate sensors 6 are installed on the back side of the screen 2, and the projection image is superimposed on the position of the flow rate sensor 6 that has detected the wind, the gap between the measurement result of the flow rate sensor 6 and the image display based on it can be decreased. That is, the embodiment ensures the more faithful display of the projection image on the region where the physical quantity change has occurred. This easily matches a sense of a user with the display of the projection image, and ensures providing a comfortable use feeling to the user.

In FIG. 6, the colors, designs and the like of the respective images can be changed based on the change in measured value of the flow rate sensor 6.

Figure 7:
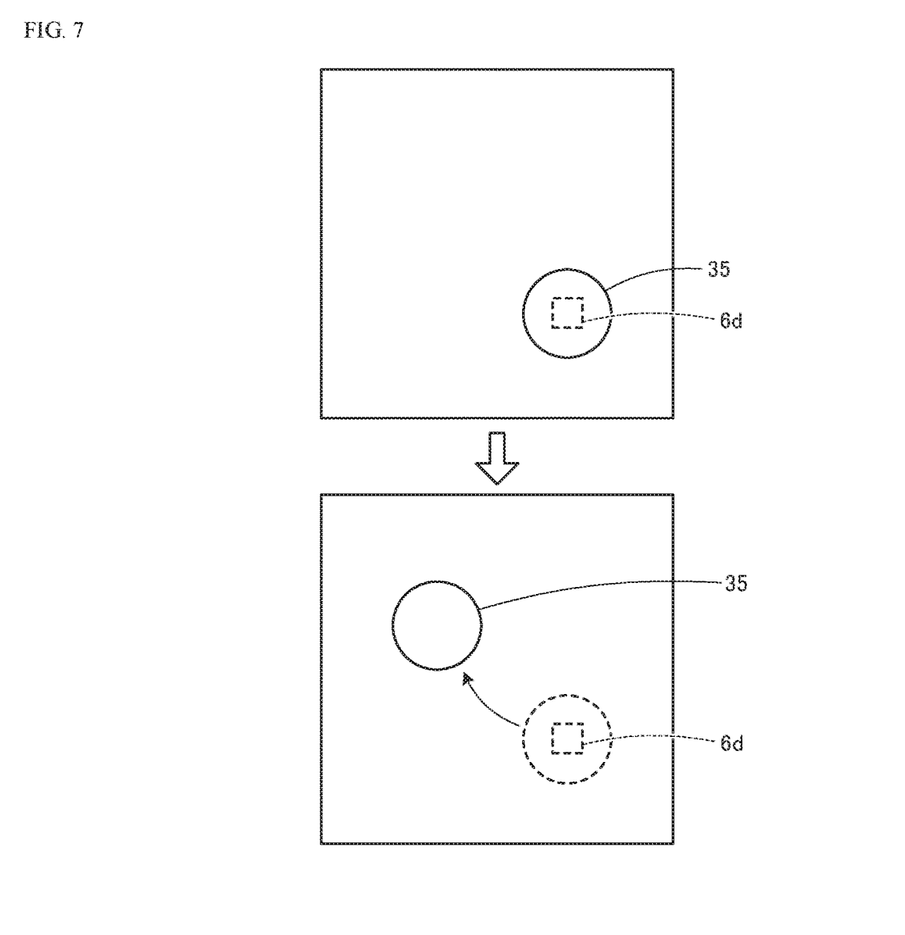
FIG. 7 is an exemplary projection image according to the embodiment.

Alternatively, as illustrated in FIG. 7, an image 35 projected on the screen 2 can be moved. That is, as illustrated in an upper drawing of FIG. 7, the image 35 is projected so as to include a position of a flow rate sensor 6d, and as illustrated in a lower drawing of FIG. 7, the image 35 can be moved on the screen 2 based on the measured value change of the flow rate sensor 6d caused by the wind detection. For example, a moving direction, a moving speed, and a moving distance of the image 35 can be changed corresponding to the measured value change.

Figure 8:
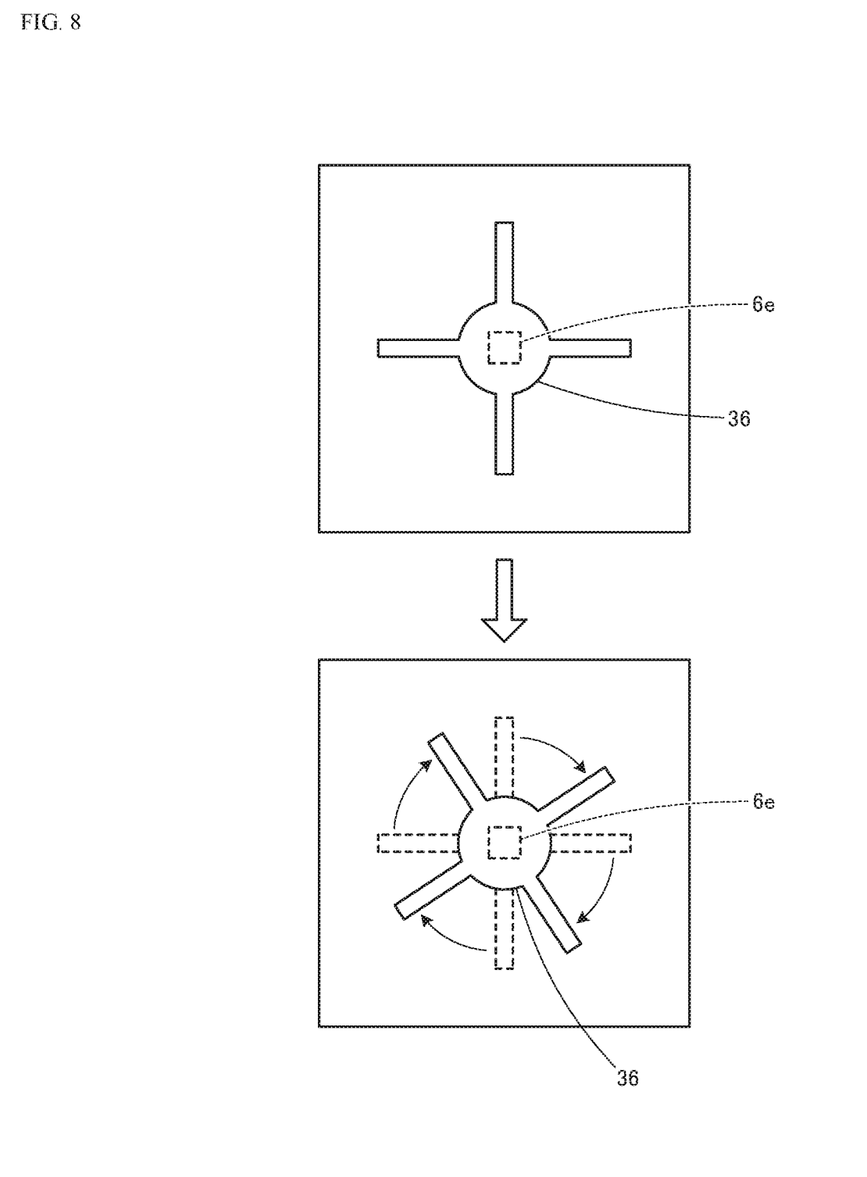
FIG. 8 is an exemplary projection image according to the embodiment.

As illustrated in FIG. 8, an image 36 projected on the screen 2 can be rotated. That is, as illustrated in an upper drawing of FIG. 8, the image 36 is projected so as to include a position of a flow rate sensor 6e, and as illustrated in a lower drawing of FIG. 8, the image 36 can be rotated on the screen 2 based on the measured value change of the flow rate sensor 6e caused by the wind detection. For example, a moving direction, a moving speed, and a moving distance of the image 36 can be changed corresponding to the measured value change.

In the embodiment, in addition to the above-described embodiments, the image can be deformed (for example, the image is enlarged or reduced), flashed, vanished, or the like based on the measured value change of the flow rate sensor 6.

In each embodiment of FIG. 6 to FIG. 8, the control device 11 in FIG. 4 specifies the flow rate sensor 6 that has detected the wind, and a predetermined image is projected on the screen 2 so as to include the position of the flow rate sensor 6 based on position information of the flow rate sensor 6. Then, the control device 11 can obtain the measured value change of the flow rate sensor 6 and perform a program control to change the image based on the measured value change.

As illustrated in FIG. 4, in the configuration including a plurality of flow rate sensors 6, the control is performed such that the image changes corresponding to the measured value changes of the respective flow rate sensors 6. For example, in the example of FIG. 7, a plurality of images 35 are displayed on the screen 2, and the moving speeds of the respective images 35 or the moving distances of the respective images 35 can be changed based on a difference among the measured value changes of the respective flow rate sensors 6.

While the change of the image displayed on the screen 2 can be performed by the computer device 5, in addition, for example, the image can be changed based on the measured value change of the flow rate sensor 6 that reacts at a position of a specific region of the screen 2 by blowing wind to the region.

The image display device 1 of the embodiment illustrated in FIG. 1 is applicable to, for example, a projection mapping.

Figure 9:
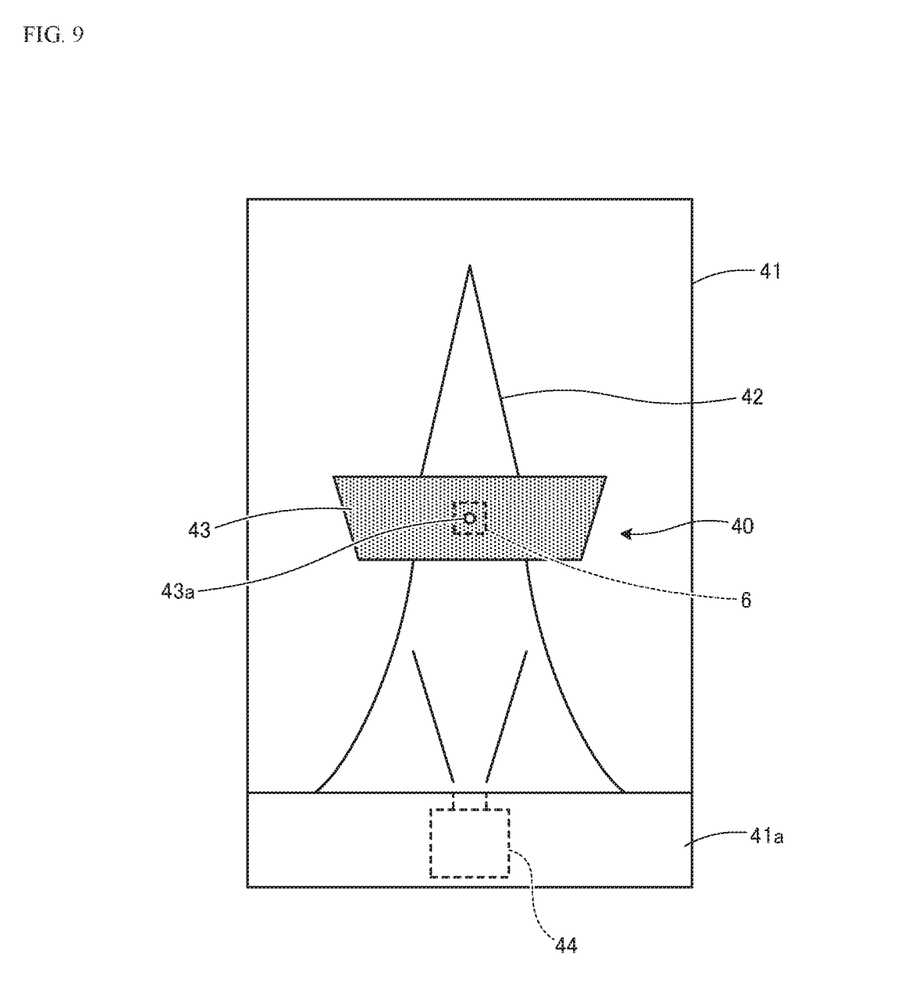
FIG. 9 is a schematic diagram illustrating an application example of the image display device according to the embodiment.

In the embodiment, as illustrated in FIG. 9, an image display device 40 can be integrally installed in a model, an ornament, and the like.

As illustrated in FIG. 9, for example, a tower model 42 is disposed in a case 41. As illustrated in FIG. 9, the tower model 42 includes one flow rate sensor 6, and a display body 43 is disposed on a front surface side of the flow rate sensor 6. This display body 43 has, for example, a box shape, and the flow rate sensor 6 is held inside the display body 43.

As illustrated in FIG. 9, the case 41 has a base 41a where, for example, a light source (projecting device) 44 that emits a laser light is disposed.

As illustrated in FIG. 9, the display body 43 has a through hole 43a communicated with the detection surface of the flow rate sensor 6, and the case 41 is configured to send the wind to the detection surface of the flow rate sensor 6. A configuration where the tower model 42 is simply disposed on the base 41a illustrated in FIG. 9 without the case 41 may be employed.

In the configuration illustrated in FIG. 9, when the wind is sent to the detection surface of the flow rate sensor 6 passing through the through hole 43a of the display body 43, the measured value of the flow rate sensor 6 changes. This causes the light source 44 to emit the laser light toward the display body 43, and for example, the display body 43 is controlled to change the color in a different color corresponding to the strength of the wind.

Figure 10:
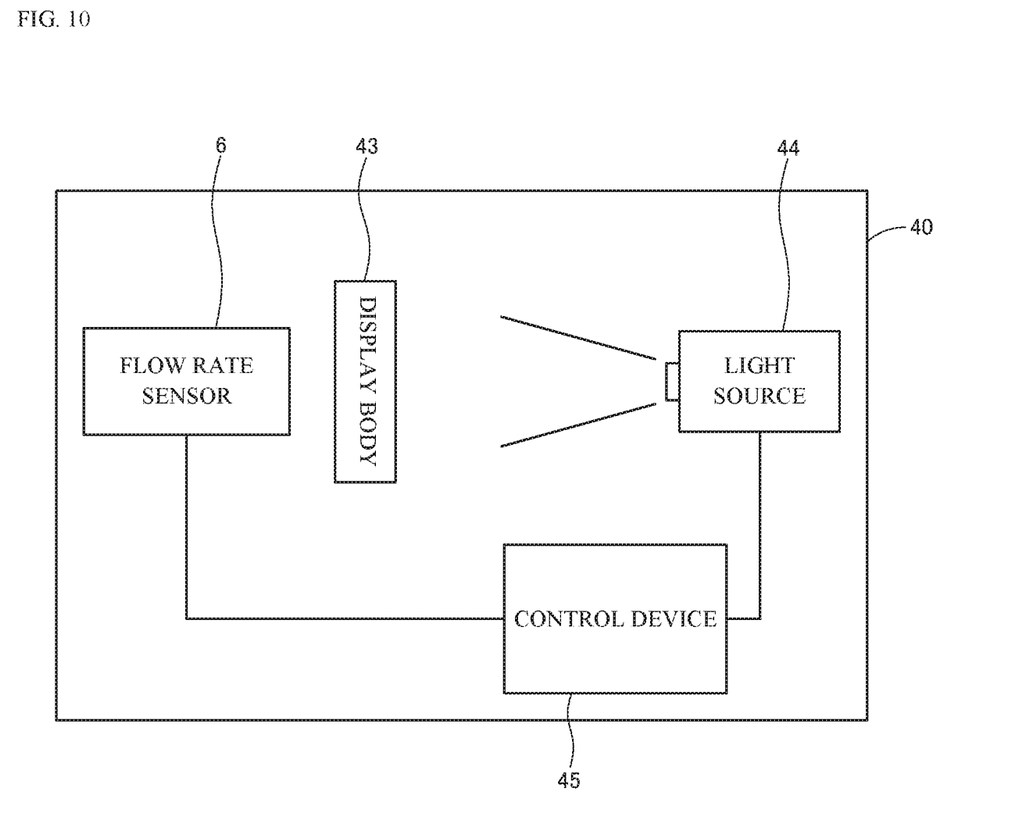
FIG. 10 is a block diagram of an image display device illustrating an embodiment different from that of FIG. 4.

FIG. 10 is a block diagram of the image display device 40 illustrated in FIG. 9, and as illustrated in FIG. 10, the image display device 40 includes one flow rate sensor 6, the display body 43, the light source (projecting device) 44, and a control device 45 that electrically couples the flow rate sensor 6 to the light source 44.

The control device 45 illustrated in FIG. 10 performs the control so as to cause the light source 44 to emit the laser light of a predetermined color toward the display body 43 with the reception of the measured value change from the flow rate sensor 6. Integrally installing the image display device 40 illustrated in FIG. 10 to the model, the ornament, and the like provides a stage effect of illuminations and the like.

It should be noted that, the present invention is not limited to the above-described embodiments, and can be variously changed to embody. In the above-described embodiments, size, shape, and the like illustrated in the attached drawings are not limited to those, and may be appropriately changed in a range that can provide the effects of the present invention. Moreover, the present invention may be appropriately changed to embody without departing from a scope of the object of the present invention.

For example, while the above-described embodiment exemplifies the flow rate sensor 6 as the physical quantity detection unit, the physical quantity detection unit is not limited to the flow rate sensor 6, and a sensor configured to detect the physical quantity change such as a temperature change, a humidity change, and a pressure change may be employed.

While the display body optionally has the through hole, it is required for the display body to have the through hole when the display body without the through hole fails to detect the change, for example, in the case where the detection target is the wind.

As illustrated in FIG. 2, in the configuration where the light emitting portion 7 such as the LED is disposed on the surface where the respective flow rate sensors 6 are disposed, the light emitting portion 7 may be electrically coupled to the flow rate sensor 6 to optionally perform the light emission when the measured value change occurs.

The configuration for use of the image display device of the embodiment is not limited to the above-described configuration, but the configuration is applicable to an electronic device, a communication device, and the like, may be installed in indoors and outdoors, and may be a fixed type or a non-fixed type.

INDUSTRIAL APPLICABILITY

The image display device in the present invention can provide an image display device matching with the sense of the user using, for example, a wind speed sensor configured to detect the wind speed. The control is performed such that, for example, when the user sends the wind toward the screen, the image display on the screen changes at the position to which the wind is sent. Therefore, the image change matches the sense of the user, thus providing the comfortable use feeling.

As an example of an application using the image display device of the present invention, the image display device of the present invention is applicable to from a large-sized application such as a projection mapping to a small-sized application such as a model. The image display device of the present invention may be integrally installed in a target device, or constituting members may be disposed in different spaces, for example, the screen 2 with the physical quantity detection device 4 illustrated in FIG. 1 is disposed outdoor while the computer device 5 is disposed indoor.

This application is based on Japanese Patent Application No. 2016-194076 filed on Sep. 30, 2016, and the disclosure of which is incorporated herein.

The invention claimed is:

1. An image display device provided with a flow-rate sensor, the image display device comprising:
   a flow-rate sensor that outputs a measured value in accordance with a strength of wind;
   a display body on which an image from a projector is projected, the display body being disposed on a detection surface of the flow-rate sensor; and
   a controller that performs an image display process based on the measured value output by the flow-rate sensor,
   wherein the display body is provided with a through-hole that is communicated with the detection surface of the flow-rate sensor, and the flow-rate sensor detects a strength of wind that flows through the through-hole, and
   wherein the controller performs a control such that the image is projected on the display body so that the image includes a position of the flow-rate sensor that has detected a change in the strength of wind, and the image changes corresponding to the measured value, output by the flow-rate sensor, of the change in the strength of wind.

2. The image display device provided with a flow-rate sensor according to claim 1,
   wherein a plurality of the flow-rate sensors are provided,
   wherein the display body is provided with a plurality of the through-holes that are communicated with the detection surface of the flow-rate sensor, and
   wherein the controller projects the image onto the display body so that the image includes the positions of each flow-rate sensor that has detected a change in the strength of wind, and performs a control such that the image changes corresponding to the measured value of the change in the strength of wind at each flow-rate sensor.

* * * * *